UNITED STATES PATENT OFFICE.

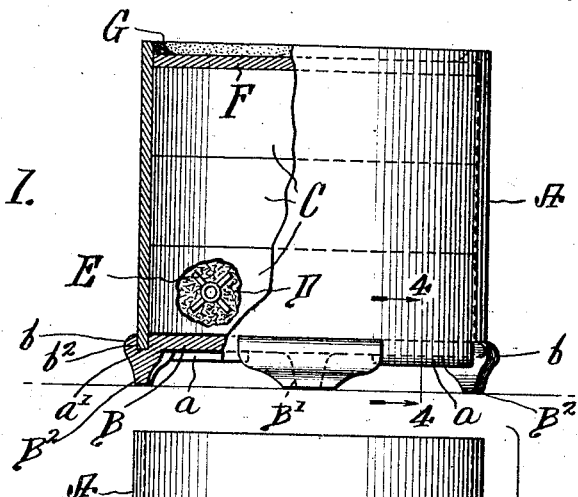
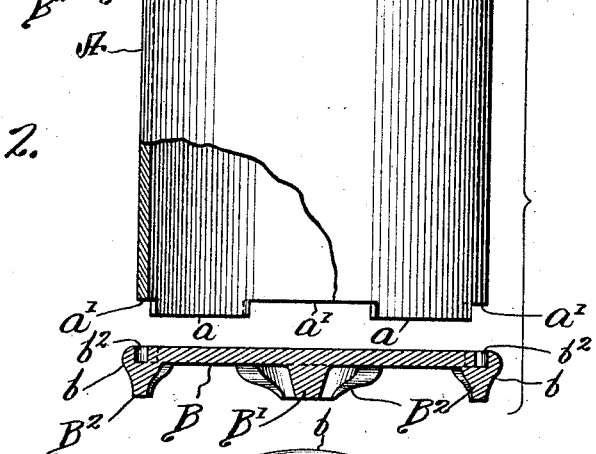
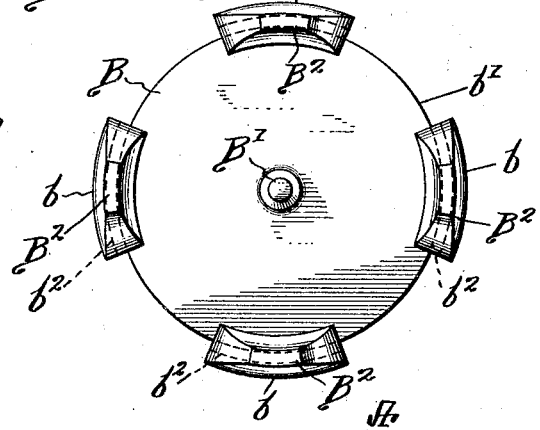

JOSEPH G. McCARREN, OF ROCKFORD, ILLINOIS.

POT FOR USE IN ANNEALING AND CARBONIZING METALS.

1,406,744.  Specification of Letters Patent.  Patented Feb. 14, 1922.

Application filed June 6, 1921. Serial No. 475,429.

*To all whom it may concern:*

Be it known that I, JOSEPH G. MCCARREN, a citizen of the United States, residing at Rockford, in the county of Winnebago and State of Illinois, have invented certain new and useful Improvements in Pots for Use in Annealing and Carbonizing Metals; and I do hereby declare that the following is a full, clear, and exact description of the invention, such as will enable others skilled in the art to which it appertains to make and use the same.

My invention relates to improvements in apparatus for use in annealing and carbonizing metals, and it consists in providing a suitable annealing or carbonizing pot which is durable, not apt to get out of order, and which may be cheaply manufactured. It is quite common in practice to have these pots made with their bottoms welded in, and when these pots with their contents are subjected to the intense heat incident to use the edges of the weld burn out and the pot becomes unsuitable for further use.

My present invention is intended to obviate this objection, and to provide certain improvements over the structure shown in my U. S. Patents No. 1,232,346, granted July 3, 1917, and No. 1,306,601, granted June 10, 1919, and both entitled Pot for use in annealing and carbonizing metals.

According to my invention, in forming the body of the pot, I cut up a hollow steel cylinder into a series of sections having one edge plane and the other edge divided with alternate tongues and notches, and I bend over these tongues to engage a cast bottom piece, the notches fitting in grooves above the supporting legs of the bottom piece. This forms a complete pot ready for use.

After the material to be treated is inserted in the pot, the cover, preferably in the form of a loose fitting disk, is inserted, and the crack between the cover and the inner wall of the pot is luted in the usual way.

My invention will be more fully understood after reference to the accompanying drawings, in which like parts are indicated by similar reference symbols throughout the several views, and in which:—

Figure 1 is a side elevation of the complete pot, filled with material and with the cover on, parts being broken away for the sake of clearness in the drawings.

Figure 2 shows a section through the bottom piece with the body of the pot separated therefrom to show the mode of assembling the two.

Figure 3 is an inverted plan view of the bottom piece of the pot; and

Figure 4 shows a section along the line 4—4 of Figure 1, and looking in the direction of the arrows.

A represents the cylindrical shell having a series of tongues or lips $a$ projecting from the bottom thereof, and spaced apart by notches or indentations, the upper wall of each indentation being indicated at $a^1$.

B represents the bottom piece which is preferably made of cast steel or cast iron. This bottom piece is provided with a central supporting leg $B^1$, and a plurality of peripheral supporting legs $B^2$ whose edges project laterally, as at $b$, beyond the circumferential edge $b^1$ of the bottom, to provide a space for the arc-shaped groove $b^2$, on the bottom of which groove the upper wall $a^1$ of the indentation in the body of the pot fits, as shown at the left of Figure 1.

In assembling the body and the bottom of the pot, the body of the pot is turned upside down and the bottom piece is applied so that the groove $b^2$ will register with the indentation $a^1$, and then the tongues or lips $a$ are bent over the edge of the inverted bottom, as shown in Figs. 1 and 4, thus firmly securing the bottom piece to the main body of the pot.

When these two parts are connected together in the manner described, the pot is ready for use, and the material to be treated may be then supplied in the usual way, being ordinarily contained in superposed trays C containing the carbonizing material D in which the articles E which are being treated are embedded in the usual way. After the trays are in place the top F is put on and the luting G applied in the usual way.

It will be noted that the bottom piece and body of the pot are securely and firmly connected together without the use of rivets or welding in such a way that it will be impracticable to separate the two members without breaking one or the other. This construction permits the use of a bottom piece of cheap and refractory material, such as cast iron.

By having the peripheral legs $B^2$ the bottom of the pot is lifted, permitting the free circulation of the heating medium beneath the pot, and the central leg $B^1$ will prevent the bottom of the pot from sagging in the centre as is liable to happen under the intense heat to which such articles are subjected incident to their normal use.

Having thus described my invention what I claim and desire to secure by Letters Patent of the United States is:—

1. An annealing pot comprising a cylindrical steel shell notched at its lower edge to provide downwardly projecting lips, and a cast metal bottom piece provided with laterally projecting lugs projecting downwardly to form peripheral legs, said lugs being provided with arc-shaped notches adapted to engage the bottom edge of the base of said shell intermediate of said lips, and said lips being bent inwards to engage the lower face of said bottom piece intermediate of said peripheral legs, substantially as and for the purposes described.

2. An annealing pot comprising a cylindrical steel shell notched at its lower edge to provide downwardly projecting lips, and a cast metal bottom piece provided with a boss projecting downwardly from the center thereof to form a central supporting leg, and laterally projecting lugs projecting downwardly to form peripheral legs, said lugs being provided with arc-shaped notches adapted to engage the bottom edge of the base of said shell intermediate of said lips, and said lips being bent inwards to engage the lower face of said bottom piece intermediate of said peripheral legs, substantially as and for the purposes described.

JOSEPH G. McCARREN